United States Patent
Chen et al.

[11] Patent Number: 5,802,918
[45] Date of Patent: Sep. 8, 1998

[54] CONCENTRIC FACE GEAR TRANSMISSION ASSEMBLY

[75] Inventors: Yih-Jen D. Chen, Chandler; Gregory F. Heath, Mesa; Ronald E. Gilbert, Payson; Vijay J. Sheth; Michael T. Morris, both of Mesa, all of Ariz.

[73] Assignee: McDonnell Douglas Helicopter Co., Mesa, Ariz.

[21] Appl. No.: 732,930

[22] Filed: Oct. 16, 1996

[51] Int. Cl.⁶ .............................. F16H 1/22; F16H 55/20
[52] U.S. Cl. .............................. 74/416; 74/409; 74/410; 74/665 A; 74/665 GC
[58] Field of Search .............................. 74/416, 409, 410, 74/420, 664, 665 A, 665 C, 665 GC, 665 H, 665 N, 665 P, 417; 475/1, 332, 343

[56] References Cited

U.S. PATENT DOCUMENTS

| | | | |
|---|---|---|---|
| 1,437,265 | 11/1922 | Oriol | 74/665 A |
| 2,262,797 | 11/1941 | Chapman | 475/332 |
| 2,315,409 | 3/1943 | Fedden et al. | 74/410 |
| 3,038,346 | 6/1962 | MacFarland | 74/409 |
| 3,374,687 | 3/1968 | Vogt | 74/417 |
| 3,375,727 | 4/1968 | Nasvytis et al. | 74/410 |
| 4,437,355 | 3/1984 | Bordat | 74/410 |
| 4,489,625 | 12/1984 | White | 475/332 |
| 4,518,287 | 5/1985 | Bossler, Jr. | 409/26 |
| 5,135,442 | 8/1992 | Bossler, Jr. | 475/1 |
| 5,149,311 | 9/1992 | Luijten | 74/420 |
| 5,178,028 | 1/1993 | Bossler, Jr. | 74/416 |
| 5,233,886 | 8/1993 | Bossler, Jr. | 74/416 |
| 5,239,880 | 8/1993 | Hawkins et al. | 74/410 |

Primary Examiner—Charles A. Marmor
Assistant Examiner—Sherry Lynn Estremsky
Attorney, Agent, or Firm—Donald E. Stout

[57] ABSTRACT

A concentric face gear assembly includes a first face gear having first face gear teeth and second face gear having second face gear teeth. At least one input pinion contacts both the first face gear teeth and the second face gear teeth, and at least one idler pinion contacts both the first face gear teeth and the second face gear teeth. The first face gear is adapted for directly driving a rotor, but the second face gear is not adapted for directly driving a rotor. The load carried by the first face gear includes the force needed to drive the rotor. Since it does not drive a rotor, the second face gear does not comprise a web or spline attachment and is therefore lightweight. Both the first face gear and the second face gear include thrust bearings, which are located radially outwardly of the first face gear teeth and radially inwardly of the second face gear teeth. The first face gear includes a web, which is relatively thin due to the thrust bearing of the first face gear being located radially outwardly of the first face gear teeth rather than radially inwardly of the first face gear teeth.

25 Claims, 8 Drawing Sheets

FIG. 9
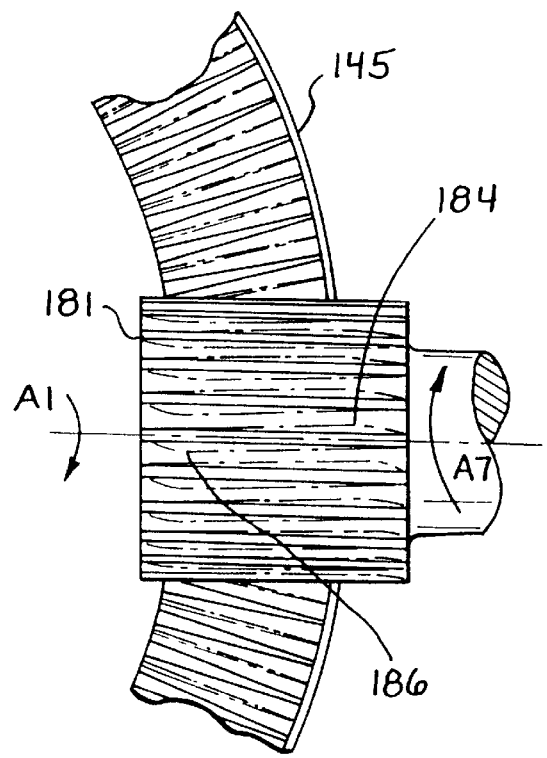
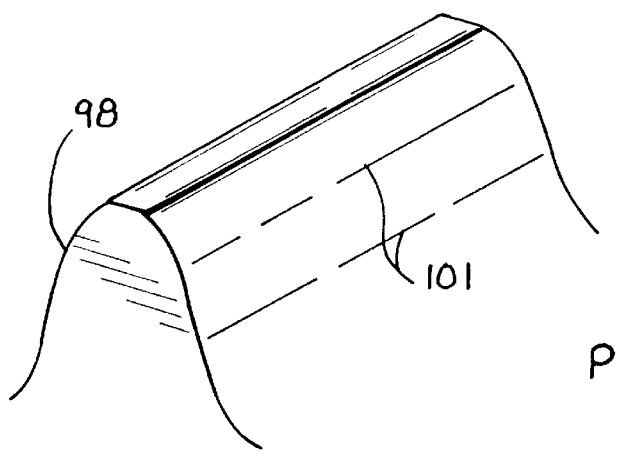
FIG. 10a
PRIOR ART
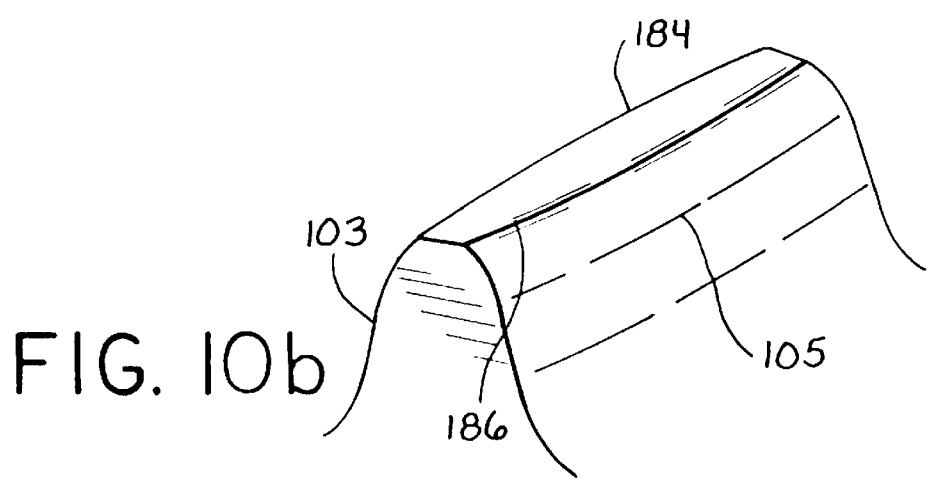
FIG. 10b 5,802,918

CONCENTRIC FACE GEAR TRANSMISSION ASSEMBLY

BACKGROUND OF THE INVENTION

1. Field of the Invention

The present invention relates generally to rotorcraft and propeller-driven aircraft and, more particularly, to lightweight split-torque proprotor transmission systems for use on such aircraft.

2. Description of Related Art

The proprotor transmission system of a rotorcraft or propeller-driven aircraft transfers power from a turbine engine to the rotor or propeller of the rotorcraft or aircraft. A typical proprotor transmission system may direct power from several turbine engines to a single rotor or propeller. Since the rotational velocity of the rotor or propeller is significantly lower than the rotational velocity of the output of one of the turbine engines, the turbine engine rotational velocity must be reduced by the proprotor transmission system. In reducing the rotational velocity of the turbine engine output, torque is increased by the proprotor transmission system through a series of intermediate gear stages and shafts, before the final output drive is provided to the rotor. Large gears are required near the final output drive of the proprotor transmission system to handle the high torque being supplied to the rotors. A typical main rotor transmission housing these heavy gears is usually the heaviest gear box in the system.

One prior art system, which has been proposed for reducing the weight of the main rotor transmission, includes a number of gears arranged for providing split-torque paths. Thus, the torque normally carried by a single drive train path is carried by two drive train paths to thereby split the torque of the original drive train path. The combined weight of these two split-torque paths is significantly less than the weight of the original single drive train path. This split-torque concept of the prior art further involves recombining the torque from the two split-torque paths prior to the final output drive. While this prior art split torque system has managed to increase the horsepower-to-weight ratio of aircraft in some situations, especially where total horsepower involved is substantial and where multiple input drive paths from different engines are present, this prior art approach still requires a relatively large weight and a relatively large volume.

FIG. 1 illustrates a prior art split-torque proprotor transmission system, which is driven by two turbine engines. An input drive shaft 1 supplies power from a first turbine engine and another input drive shaft (not shown) located on the opposite side of the combining gear 9 supplies power from another turbine engine. The spur pinion 2 splits the power from the input drive shaft 1 between a first face gear 3 and a second face gear 4. The torque supplied by the spur pinion 2 is effectively split between the first face gear 3 and the second face gear 4.

The spur pinion 2, which rotates in the direction of the arrow A1, causes the first face gear 3 to rotate in the direction of the arrow A2 and causes the second face gear 4 to rotate in the direction of the arrow A3. A first spur pinion 5 connected to the first face gear 3 also rotates in the direction of the arrow A2, and a second spur pinion 6 connected to the second face gear 4 rotates in the direction of the arrow A3. The first spur pinion 5 and the second spur pinion 6, rotating in the directions of the arrows A4 and A5, respectively, cause the combining gear 9 to rotate in the direction of the arrow A6. The torque from the first spur pinion 5 and from the second spur pinion 6 is thus recombined at the combining gear 9 stage. The input drive shaft (not shown) driven by the second turbine engine operates on a pair of face gears and spur pinions similar to the first face gear and spur pinion 3, 5 and the second face gear and spur pinion 4, 6. This second set of face gears and spur pinions splits the torque supplied from the second turbine engine, and this torque is recombined at the combining gear 9 stage. An idler 7, which is connected to the combining gear 9, drives a face gear 8. The face gear 8 may be connected to an accessory output. A planetary stage 10 receives power from the combining gear 9, and eventually routes this power to a rotor.

Another proprotor transmission system of the prior art is illustrated in FIG. 2. Only half of a cross-sectional view of the conventional transmission 11 is shown in FIG. 2. The input shaft 12 supplies torque from a turbine engine and rotates the input bevel pinion 14. The input bevel pinion 14 meshes with a bevel gear 16 at the first stage gear meshing 18. The bevel gear 16 is moved by the input bevel pinion 14 about the shaft 21, to thereby rotate the shaft 21 with a rotational velocity. A helical pinion 23 connected to the shaft 21 meshes with a helical gear 27 at a second stage gear meshing 25. The gear 27 is rotated about the static support assembly 38 with a rotational velocity. A female spline 30, which is connected to the gear 27, transfers torque from the gear 27 to a male spline 32. The male spline 32 transfers torque to a sun gear 34 and to a number of planet gears 36. The sun gear 34 and planet gears 36 operate to route power to a rotor (not shown).

The prior art transmission 11 shown in FIG. 2 is somewhat heavy and voluminous. Additionally, relatively large bearings must be used on the input shaft 12, to support forces generated by the shaft 21 at the first gear meshing 18. A need exists in the prior art for a proprotor transmission system, which is relatively small in size and weight, and which does not require large bearings to support the input shaft.

SUMMARY OF THE INVENTION

The concentric face gear assembly of the present invention includes at least one input pinion arranged in mesh between two concentric face gears. The two concentric face gears are arranged with their teeth facing one another. This arrangement of the two concentric face gears directly over and under one another on the same centerline results in a compact configuration. In addition to saving space, the concentric face gear assembly of the present invention is relatively simple in construction, and requires fewer gears than comparable proprotor transmission systems of the prior art.

In addition, one of the face gears does not comprise a web, and is thus more lightweight than other gears used in conventional proprotor transmission systems. The input torque from the input pinion is split between the two face gears in an even manner. Other input pinions may be used to supply input torque from other turbine engines. Idler gears are placed between the two concentric face gears, and between the input pinions, to recombine torque and power to the face gear driving the rotor.

The concentric face gear assembly increases horsepower-to-weight ratios for main rotor transmissions, to thereby reduce procurement and operating costs and increase flight performance, payload, and range capabilities. Since the concentric face gear assembly is compact in design, the main rotor transmission power carrying capacity can be increased, without exceeding space allotments typically available for such subsystems. The concentric face gears operate to split torque, while maintaining compactness, concentricity, and a reduced number of stages. Since the input pinions are meshed between the two concentric face gears, most gear mesh load components on the input pinions are cancelled, to thereby yield smaller net loads and smaller bearing requirements on these input pinions. The idler pinions are also located in mesh between the two concentric face gears, but since these act as idlers, some of the load components for the idler pinions are additive and others cancel, and the bearings still decrease in size but not as much as those for the input pinions do. Additionally, when two or more input pinions provide power to the concentric face gear assembly, the concentric face gear assembly may be adapted to accommodate one-engine-inoperative operating contingencies without the addition of large and/or heavy equipment.

According to one broad aspect of the present invention, the concentric face gear assembly includes a first face gear having a plurality of first face gear teeth and second face gear having a plurality of second face gear teeth. At least one input pinion contacts both the first face gear teeth and the second face gear teeth, and at least one idler pinion contacts both the first face gear teeth and the second face gear teeth. The teeth and rims of the first and second face gears are sized for the mesh loads encountered through their contacts with the input and idler pinions. The first face gear also includes a web and spline arrangement which is adapted for carrying load, as it transmits the power needed to drive the rotor. This web is relatively thin because it only carries torsion loads and does not have to carry either moment or thrust loads. The second face gear is lighter than the first face gear since it does not require either a web or a spline. This is because only the teeth and rims carry load, which is transmitted directly around the outside of the gear from the driving input pinions to the driven idler pinions. Both the first face gear and the second face gear include thrust bearings, which are located radially outwardly of the first face gear teeth and radially inwardly of the second face gear teeth.

According to another broad aspect of the present invention, a second input pinion and a second idler gear are provided between the first face gear teeth and the second face gear teeth. The second input pinion is located opposite the first input pinion, and the second idler gear is located opposite the first idler gear. Both the first idler gear and the second idler gear are adapted for recombining torque from the second face gear back to the first face gear. The concentric face gear assembly further includes a planetary stage of gears, which is disposed between the first and second face gears and a rotor.

According to another broad aspect of the present invention, backlash clearances of the two idler gears are equalized to ensure that an equal amount of torque is carried by each of the two idler gears. Each of the two idler gears includes an axis of rotation, which does not intersect an axis of rotation of either of the two face gears. The backlash clearances of the two input pinions are equalized to ensure that an equal amount of torque is delivered to each of the two face gears. The clearance between each idler gear and the two face gears is set by first positioning the idler gear between the two face gears, such that the axis of rotation of the idler gear does not intersect the axis of rotation of either of the two face gears. In such a configuration, the contacts of the idler gear teeth on the drive side with the upper face gear teeth and on the coast side with the lower face gear teeth are anticipated. If the teeth do not engage simultaneously, the idler gear is then moved along its axis of rotation to thereby move the idler gear teeth into contact with the plurality of teeth of the two face gears.

The present invention, together with additional features and advantages thereof, may best be understood by reference to the following description taken in connection with the accompanying illustrative drawings.

BRIEF DESCRIPTION OF THE FIGURES

FIG. 9 illustrates a schematic diagram showing alignment considerations for installation of the idler pinion of the presently preferred embodiment;

FIGS. 10a and 10b illustrate straight line and crowned pinion teeth, respectively;

DETAILED DESCRIPTION OF THE PREFERRED EMBODIMENTS

Figure 3:
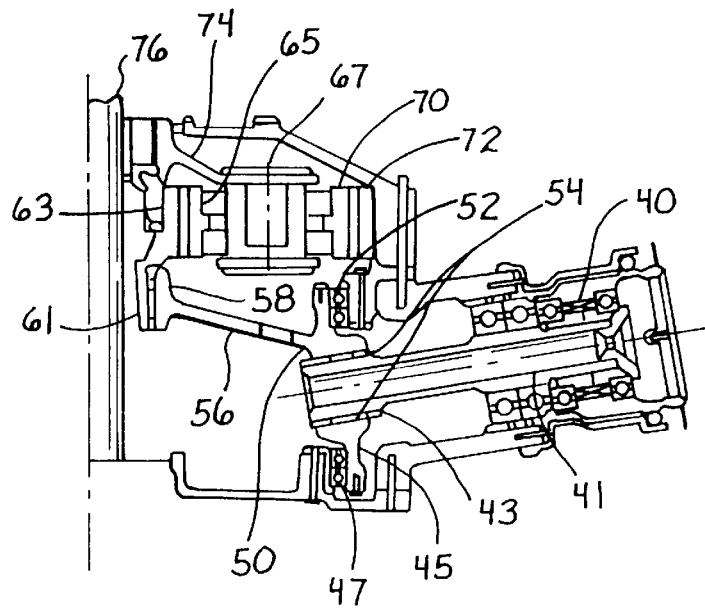
FIG. 3 illustrates a partial cross-sectional view of the concentric face gear transmission assembly according to the presently preferred embodiment.

A partial cross-sectional view of the concentric face gear transmission assembly of the presently preferred embodiment is illustrated in FIG. 3. Power from a turbine engine (not shown) is transferred via an input clutch 40 to an input shaft 41. An input spur pinion 43, which is connected to the input shaft 41, is meshed between a lower face gear 45 and an upper face gear 50. The lower thrust bearing 47 of the lower face gear 45 is located radially inwardly of the lower face gear 45. The upper thrust bearing 52 is located radially outwardly of the upper face gear 50. Torque from the input shaft 41 is split between the lower face gear 45 and the upper face gear 50 at the single stage gear meshing 54.

The upper face gear 50 comprises a web 56, which leads to a female spline 58. The female spline 58 of the upper face gear 50 meshes with a male spline 61. The male spline 61 is connected to a sun gear 63, which meshes with an inner-radial portion of a planet gear 65. The planet gear 65, having an axis 67, rotates about the sun gear 63. An outer radial portion 70 of the planet gear 65 meshes with a ring gear 72. The planet carrier 74 is connected to the planet gear 65 and is rotated about the static support assembly 76. Power from the planet carrier 74 is used to drive the rotor of the aircraft through a main rotor drive shaft.

Figure 2:
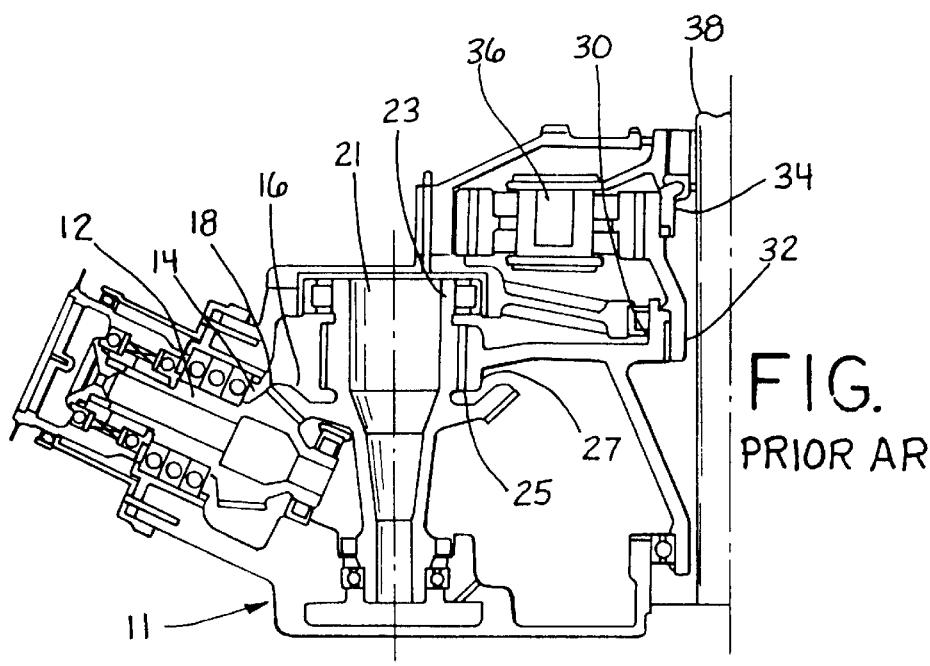
FIG. 2 illustrates a partial cross-sectional view of another transmission according to the prior art.

The concentric face gear transmission assembly shown in FIG. 3 is significantly smaller in size than the prior art transmission 11 shown in FIG. 2. The concentric face gear transmission assembly of the present invention is able to achieve a high horsepower-to-weight ratio with a simple configuration having fewer parts. While the transmission 11 shown in FIG. 2 comprises a first stage gear meshing 18 and a second stage gear meshing 25, the concentric face gear transmission assembly of the present invention uses only a single stage gear meshing 54. The inherent high load carrying capacity of the present invention allows for high reduction ratios in this single stage.

The lower face gear 45 and the upper face gear 50 of the presently preferred embodiment are used in an angular-drive application. Generally, face gears possess configurational advantages over beveled gears used in conventional split-torque designs of similar application. A single, conventional bevel-type pinion cannot drive two bevel gears simultaneously, unless the shaft angle is exactly 90 degrees, and then only if reduced capacity straight bevels rather than spiral bevels are used. In contrast, the concentric face gear transmission assembly of the present invention provides for an input shaft 41, which drives both a lower face gear 45 and an upper face gear 50. Unlike the face gears of the present invention, conventional bevel gears must mesh along theoretical (pinion and gear) cones, which lay tangent to one another. For any angle other than 90 degrees, two bevel gear cones of a conventional split-torque design cannot both be tangent to a single pinion cone and still remain coaxial.

Figure 4:
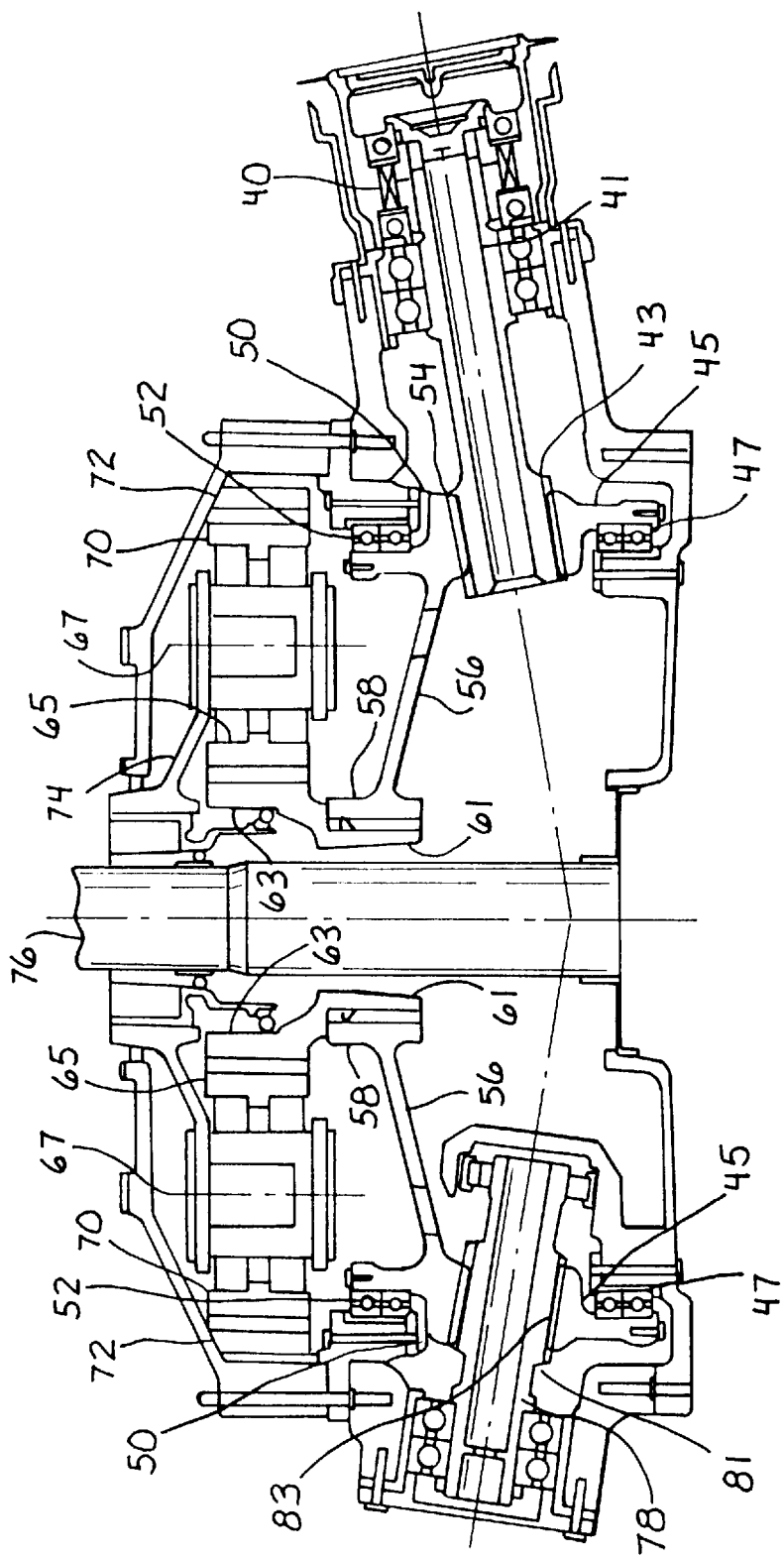
FIG. 4 illustrates a cross-sectional view of the concentric face gear transmission assembly of the presently preferred embodiment.

Turning to FIG. 4, a full cross-sectional view of the concentric face gear transmission assembly of the presently preferred embodiment is illustrated. The cross section is taken through an input spur pinion 43 and an idler pinion 81. In the presently preferred embodiment, the input spur pinion 43 is located opposite to a second input spur pinion (not shown), and the idler pinion 81 is located opposite to a second idler pinion (not shown). Each of the two input spur pinions 43 receives torque from a corresponding turbine engine, and transfers this torque to both the lower face gear 45 and the upper face gear 50. As discussed below, each of the two idler pinions 81 operates to transfer torque, placed on the lower face gear 45 by the two input spur pinions, onto the upper face gear 50.

The idler pinion 81 is connected to an idler shaft 78, which rotates about an axis that nearly intersects an axis of the static support assembly 76. The idler pinion 81 meshes with the lower face gear 45 and the upper face gear 50 at a single stage mesh 83.

The concentric face gear transmission assembly of the present invention preferably maintains a cylindrical shape along it height, requiring less space than conventional transmission designs carrying similar power. The transmission assembly of the present invention can provide more power in the same space, or require less space for the same power originally specified for a particular application or purpose. Comparing the concentric face gear transmission assembly of the present invention with the conventional transmission 11 shown in FIG. 2, for the same power rating of 5,000 horsepower, the transmission assembly of the present invention requires approximately 3.7 cubic feet while the conventional transmission 11 requires approximately 6.48 cubic feet. The weight of the transmission assembly of the present invention is approximately 725 pounds, while the weight of the conventional transmission 11 is approximately 1200 pounds. The MTBR of the transmission assembly of the present invention is approximately 5,000 hours, and the MTBR of the prior art transmission 11 is approximately 2,000 hours.

The lower face gear 45 and the upper face gear 50 of the present invention provide power transmission equal to or better than conventional spiral bevel and helical gears without producing a thrust load on the input spur pinion 43 or idler pinion 81. Consequently, the required sizes of the bearings used on the input spur pinion 43 and idler pinion 81 are significantly reduced. The location of the upper thrust bearings 52 behind the back-up rims of the upper face gear 50, and the location of the lower thrust bearings 47 behind the back-up rims of the lower face gear 45 further serve to reduce the weight of the face gear transmission assembly. In particular, the location of the upper thrust bearings 52 greatly reduces deflection of the web 56, and allows for a significant reduction in the overall thickness of the web 56. The thrust bearing of a conventional face gear is located radially inwardly, and may be somewhat smaller than the upper thrust bearing 52 of the present invention. Location of the upper thrust bearing 52 of the present invention radially outwardly, however, provides for significant reduction in the size of the web 56, resulting in an overall weight decrease of the face gear transmission assembly. In addition, the location of the lower thrust bearings 47 behind the rim of the lower face gear 45 saves weight by eliminating the need for any web at all. A web would have been required to extend gear structure inward from the tooth rim area to smaller bearings near the vertical centerline of the transmission if smaller bearings had been used. A web also would have been required if the lower face gear 45 included a spline near its center for use in driving a rotor or additional reduction stage, as was the case for the upper face gear 50.

The first stage gear meshing 18 of the prior art transmission 11 (FIG. 2) has associated therewith a reaction force in the separating direction. As the input spur pinion 14 meshes with the gear 16, these two gears 14, 16 tend to push away from one another in the separating direction. The bearings of the input shaft 12 must be large enough to accommodate this separating force at the first stage gear meshing 18. In contrast, any separating forces with the present invention between the input spur pinion 43 and the upper face gear 50 are cancelled by similar separating forces between the input spur pinion 43 and the lower face gear 45. Thus, since reaction forces at the single stage gear meshing 54 of the present invention are equal and opposite, the size of the bearing for the input shaft 41 may be reduced. Similarly, smaller bearings may be used for the idler shaft 78 compared to idlers used in conventional designs because some of the reaction forces (radial loads) on the idler pinion are canceled. The weight and volume benefits for idler pinion bearings are decreased relative to the input pinion bearings, however, since other forces (tangential loads) are additive as in conventional idler usage.

Figure 5:
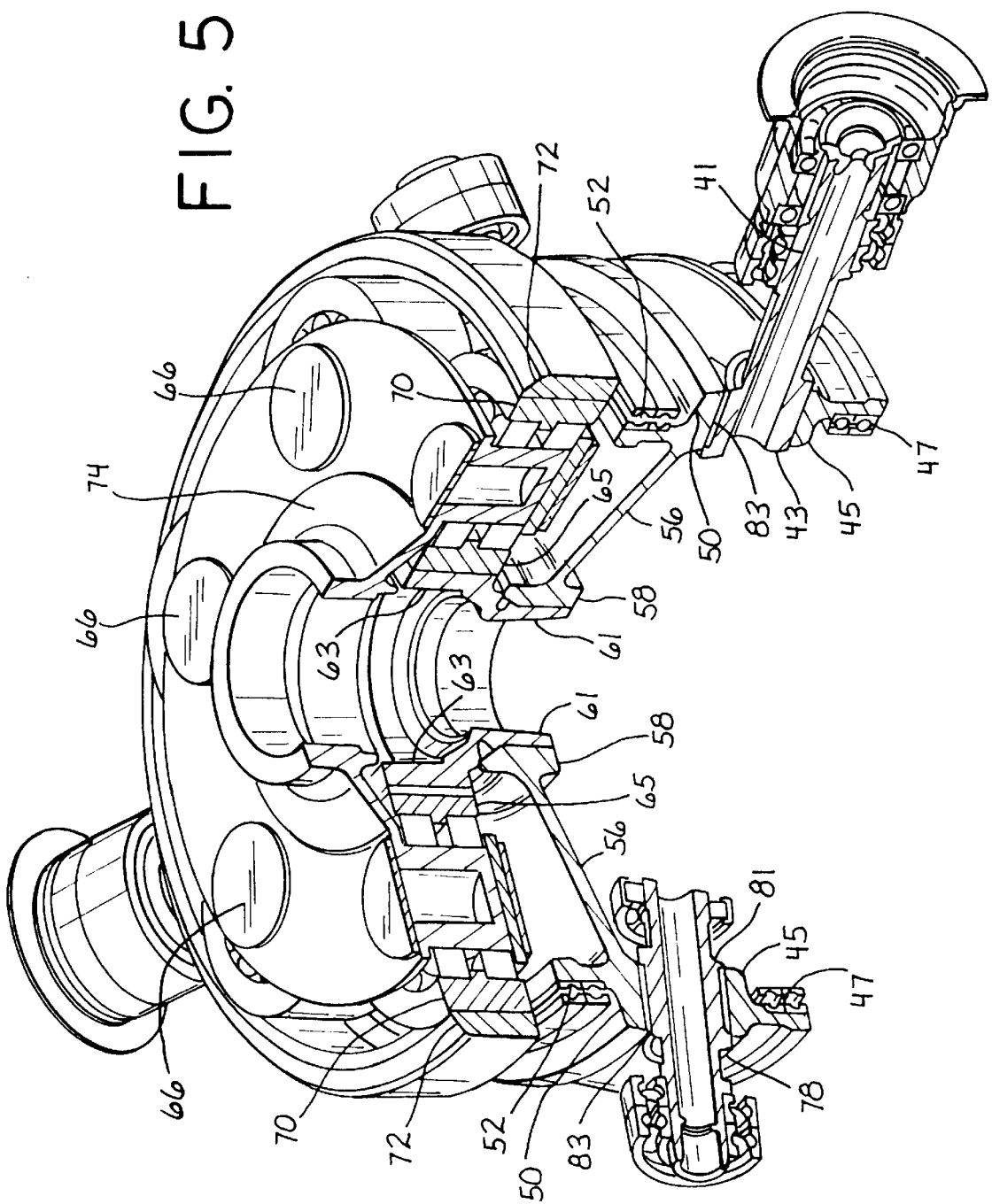
FIG. 5 illustrates a first perspective cut-away view of the concentric face gear transmission assembly according to the presently preferred embodiment.
Figure 6:
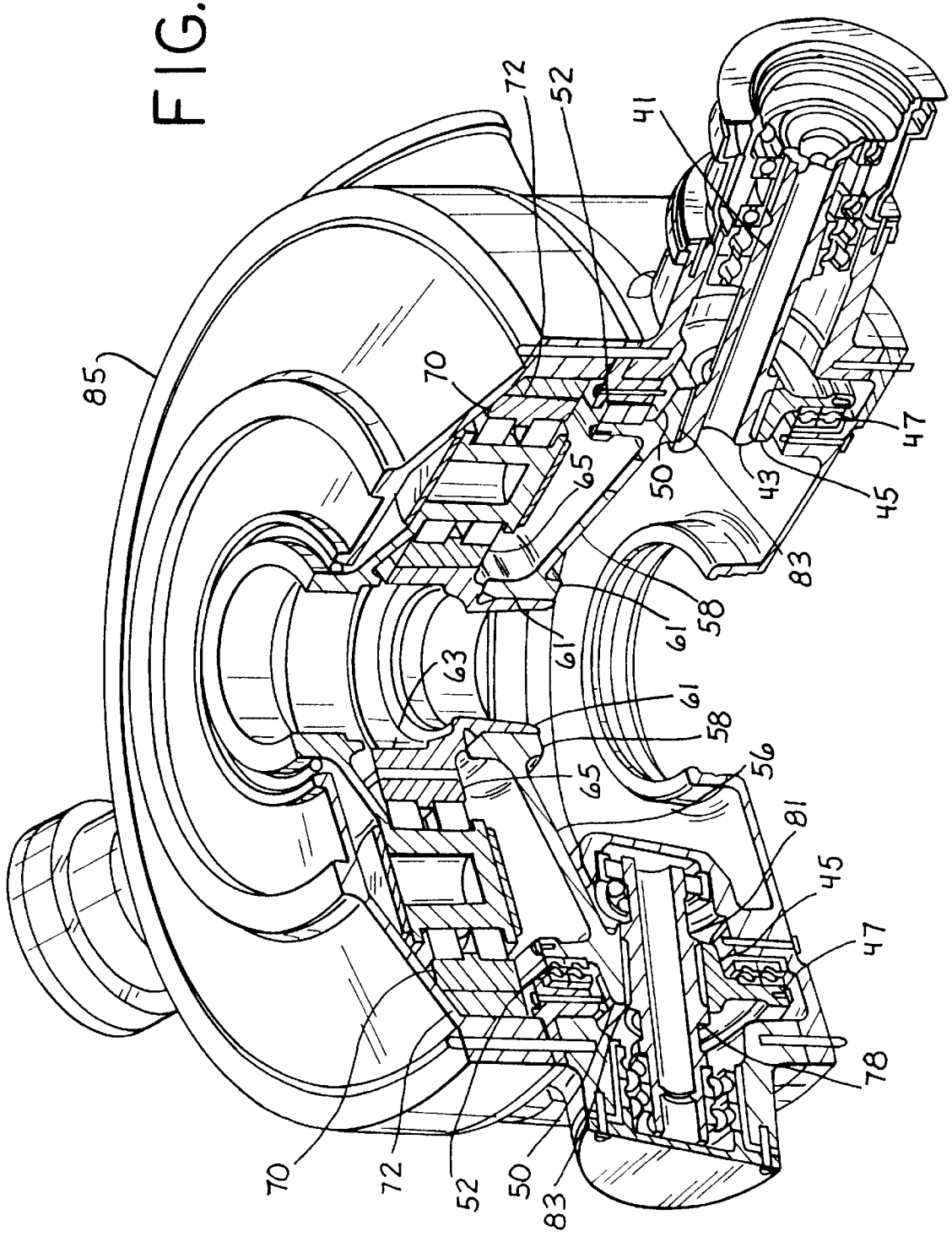
FIG. 6 illustrates a second cut-away perspective view of the concentric face gear transmission assembly according to the presently preferred embodiment.

Turning to FIG. 5, a perspective view of the concentric face gear transmission assembly is shown, with a cut-away portion corresponding to the cross-sectional view of FIG. 4. FIG. 6 illustrates the configuration of FIG. 5, at a later assembly stage. The upper housing 85, for example, and other elements are shown in the illustration of FIG. 6. Input torque supplied by the input spur pinion 43, for example, is split between the lower face gear 45 and upper face gear 50. The input spur pinion 43 is preferably mounted in a compliant arrangement between the lower face gear 45 and the upper face gear 50 to allow the input spur pinion 43 to float between the two face gears 45, 50. The input spur pinion 43 is thus able to float and find a center-of-force equilibrium between the meshes of the lower face gear 45 and the upper face gear 50. When the force equilibrium is achieved, one half of the total load from the input spur pinion 43 is transferred to the lower face gear 45, and one half of the total load from the input spur pinion 43 is transferred to the upper face gear 50.

Since one half of the total load from the input spur pinion 43 is transferred to the lower face gear 45, a means for redirecting this power back up and toward the upper face gear 50 is required. The idler pinion 81 provides this function. Although the presently preferred embodiment comprises two input spur pinions 43, two or more idler pinions 81 are preferably interspersed between the input pinions evenly distributed around the circumference of the two face gears 45, 50. Both the input pinions and the idler pinions are thus sandwiched by and enmeshed with the same two face gears 45, 50. The idler pinions route power back up to the upper face gear 50, which in turn drives the sun gear 63 of the planetary stage.

The lower face gear 45 functions to receive power from the input spur pinions 43, and to route this received power through the idler pinions 81 up to the upper face gear 50. The lower face gear 45 requires no gear web or central shaft, as these items would not be under load if they were present in designs involving applications in which the transmission drives a single rotor or propeller. Consequently, according to the presently preferred embodiment, only the gear rim and gear teeth comprise the lower face gear 45, thus resulting in a substantial reduction in weight.

Figure 1:
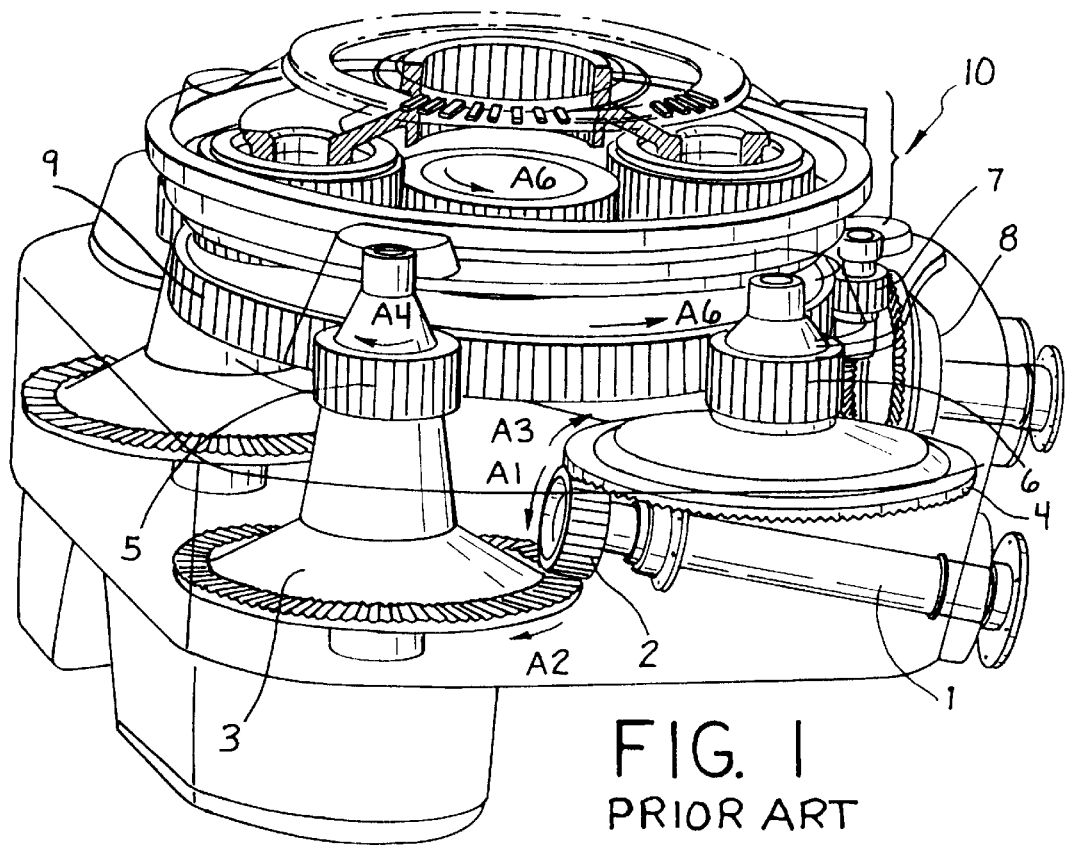
FIG. 1 illustrates a split-torque proprotor transmission according to the prior art.

In addition to recombining power from the lower face gear 45 back up to the upper face gear 50, each of the idler pinions 81 may be used to provide a drive pathway to accessories outside of the transmission. As illustrated in the depiction of a conventional system in FIG. 1, for example, an extra idler pinion 7 must be combined with an extra face gear 8 to thereby provide an accessory output. Thus, while conventional transmissions require extra gears and bearings to drive accessories, the transmission assembly of the present invention has these idler gears already present.

Since power from the lower face gear 45 is recombined to the upper face gear 50 via the idler pinions 81, the upper face gear web 56 is sized to carry full load. The teeth of the upper face gear 50 and lower face gear 45, the teeth of the input spur pinion 43, and the teeth of the idler pinion 81 need only be sized in diameter and width to carry the load seen at each respective mesh. For normal operation, according to the presently preferred embodiment, the load seen in each mesh is one half of the maximum continuous power for each turbine engine.

The input spur pinions and the face gears are sized, however, to carry one half of the one-engine-inoperative power in each mesh. In a one-engine-inoperative (OEI) condition, one of the two turbine engines supplying power to the upper and lower face gears via the input spur pinions becomes inoperative. The loading on the meshes at the one-engine-inoperative power level is typically 1.2 to 1.3 times the maximum continuous power loading. During a one-engine-inoperative emergency condition, only one turbine engine is providing input power to the face gear transmission assembly via a single input spur pinion. After the input torque from this single turbine engine is divided in half at the single stage gear meshing 54 the idler pinions 81 distribute the one-half load channeled to the lower face gear 45 amongst themselves prior to redirecting this power back to the upper face gear 50.

In addition to the idler pinions 81, the input spur pinion, which corresponds to the inoperative turbine engine, operates as an additional idler pinion 81. Thus, in a regular maximum continuous power condition, each of the idler pinions 81 operates to carry one half of the load on the lower face gear 45, but in a one-engine-inoperative condition, each of the two idler pinions operates to carry one third of the load of the lower face gear 45. The non-driving input pinion carries the other one third of the load. Since the idler pinions 81 and the non-driving input spur pinion together act to distribute the load channeled to the lower face gear by the driving input spur pinion, each actual idler pinion 81 carries less load during a one-engine-inoperative condition than during normal maximum continuous power operation. Consequently, the idler pinions 81 do not need to be increased in size or strength in order to function properly during a one-engine-inoperative condition. Conventional transmissions require size increases for all components of reduction stages which must be able to carry one-engine-inoperative power. The configuration of the face gear transmission assembly of the present invention thus reduces the severity of one-engine-inoperative power requirements for rotorcraft main transmissions.

Figure 7:
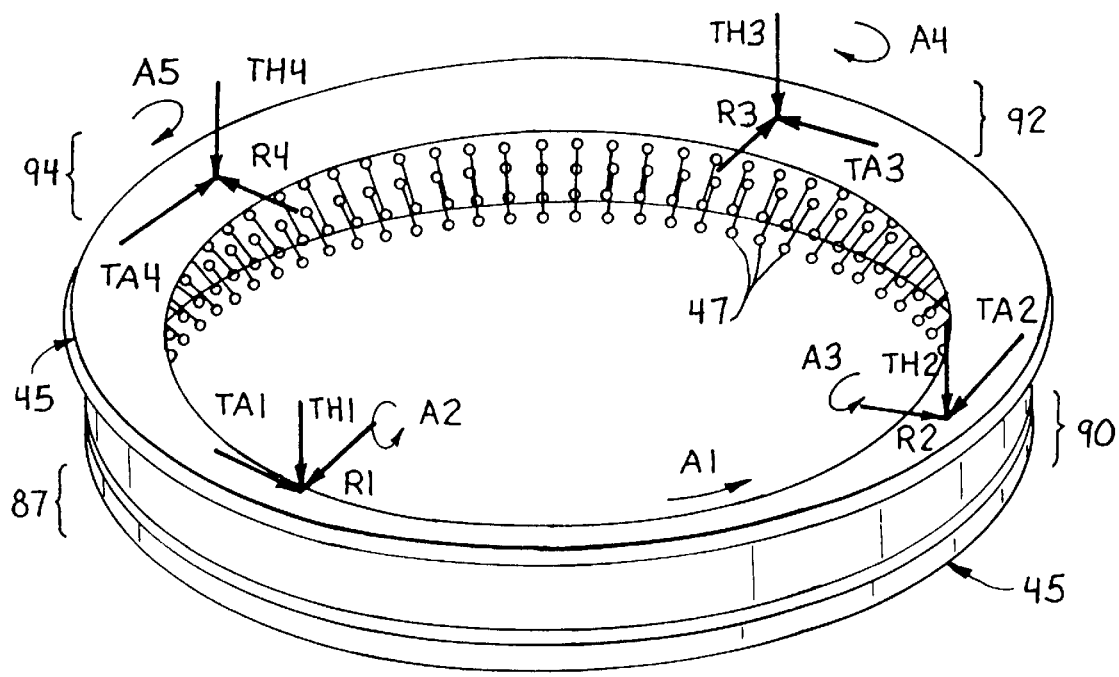
FIG. 7 illustrates a finite element model analysis of the forces acting on the lower face gear, according to the presently preferred embodiment.

Turning to FIG. 7, the lower face gear 45 is illustrated with lower thrust bearings 47. The forces of the lower face gear 45 exerted by the first input pinion meshing 87 comprise a tangential component TA1, a radial component R1, and a thrust component TH1. The first input pinion rotates above the lower face gear 45 in the direction of the arrow A2, and exerts the tangential, thrust, and radial forces TA1, TH1, and R1 on the lower face gear 45. The forces on the lower face gear 45 exerted by the first idler pinion meshing 90 comprise a tangential component TA2, a thrust component TH2, and a radial component R2. The first idler pinion rotates above the lower face gear 45 in the direction of the arrow A3. The forces on the lower face gear 45 exerted by the second input meshing 92 comprise a tangential component TA3, a thrust component TH3, and a radial component R3. The second input pinion rotates above the lower face gear in the direction of the arrow A4. The forces exerted on the lower face gear 45 by the second idler pinion meshing 94 comprise a tangential component TA4, a thrust component TH4, and a radial component R4. The second idler pinion rotates above the lower face gear 45 in the direction of the arrow A5.

The tangential components TA2 and TA4 exerted by the first and second idler pinions are in directions opposite to the directions of rotation A3, A5 of the first and second idler pinions, respectively. These reactionary forces TA2 and TA4 are exerted by the first and second idler pinions in response to forces from the lower face gear that cause the first and second idler pinions to rotate in the directions A3 and A5, respectively. The first and second idler pinions have opposite reactions so that their load reaction is in a direction along the circumference of the lower face gear 45 opposite to the tangential components TA1 and TA3 of the first and second pinions, respectively. This results in significant load cancellation. The thrust components TH1 and TH3 of the first and second idler pinions, respectively, are cancelled by other thrust components exerted by these input pinions on the upper face gear. Similarly, the thrust components TH2 and TH4 exerted by the first and second idler pinions on the lower face gear are cancelled by similar thrust components exerted on the upper face gear by these idler pinions. In addition to the advantage of smaller bearings, resulting from these cancellations on the idler pinions and input pinions in the radial and thrust directions, a fair amount of cancellation on the lower face gear 45 is achieved, resulting in smaller lower thrust bearings 47.

Figure 8:
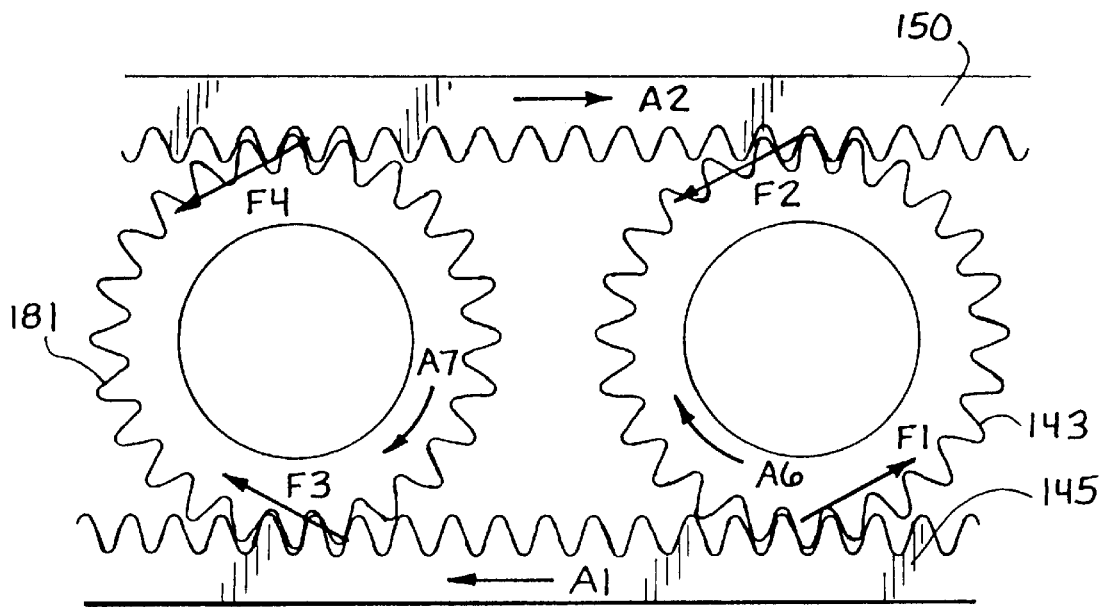
FIG. 8 illustrates a force analysis of forces acting on an input spur pinion and an idler pinion, accordingly to the presently preferred embodiment.

FIG. 8 illustrates a cross-sectional view of an input spur pinion 143 between a lower face gear 145 and an upper face gear 150. An idler pinion 181 is also meshed between the lower face gear 145 and the upper face gear 150. The input spur pinion 143 rotates in the direction of the arrow A6, the idler pinion 181 rotates in the direction of the arrow A7, the lower face gear 145 rotates in the direction of the arrow A1, and the upper face gear 150 rotates in the direction of the arrow A2. As the input spur pinion 143 rotates in the direction of the arrow A6, the input spur pinion 143 drives the upper face gear 150 in the direction of the arrow A2 and drives the lower face gear 145 in the direction of the arrow A1. One half of the torque from the input spur pinion 143 is transferred to each of the face gears 150 and 145. A reaction force F1 is exerted by the lower face gear 145 on the input spur pinion 143, and a reaction force F2 is exerted by the upper face gear 150 on the input spur pinion 143. These two reaction forces F1 and F2 are opposite to one another, thus resulting in significant cancellation.

The torque received by the lower face gear 145 from the input spur pinion 143 is transferred to the idler pinion 181, to thereby drive the idler pinion 181 in the direction of the arrow A7. The idler pinion 181 transmits this power to the upper face gear 150. A reaction force F3 is exerted by the lower face gear 145 onto the idler pinion 181 to thereby cause the idler pinion 181 to rotate in the direction of the arrow A7, and a reaction force F4 is exerted by the upper face gear 150 in response to the torque transmitted from the idler pinion 181 onto the upper face gear 150. The rotor absorbs the power from the upper face gear, so that there is a differential of power between the upper face gear 150 and the lower face gear 145 on the idler pinion 181, the power in the lower face gear is transferred to the upper face gear, where the transferred power is subsequently used to drive the rotor.

The backlash clearance between the idler pinion 181 and the upper face gear 150 must be very close to the backlash clearance between the idler gear 181 and the lower face gear 145. Additionally, the backlash clearances between any other idler pinions and their respective face gears must be very close to the backlash clearances between the idler pinion and its face gears, to assure that an equal amount of torque is carried by each of the idler pinions. If the backlash clearances are not very close, then one idler pinion will be driving the upper face gear 150 more than the other idler pinion.

Equal backlash clearances between the idler pinions and their respective face gears are assured, in accordance with the present invention, through use of both an offset tooth crowning method and a slight angular advance for each idler pinion. As shown in FIG. 9, an idler pinion 181 preferably comprises a drive side tooth crowning 184 and a coast side tooth crowning 186. FIG. 10a illustrates a regular pinion tooth 98 having a constant cross section from front to back as indicated by the straight dashed lines 101. FIG. 10b illustrates a crowned pinion tooth 103 having thicker widths in the drive side area 184 and the coast side 186 than in the central portion of the crowned pinion tooth 103.

During assembly, the idler pinion 181 can be advanced along its axis of rotation in the radially inward or radially outward direction to thereby adjust the backlash clearance between the idler pinion and the upper and lower face gears. The remainder of the backlash clearance may be adjusted by advancing the axis of rotation of the idler pinion 181 in the direction of rotation A7 of the idler pinion 181. The 0.004 inch offset shown in FIG. 9 operates to move the axis of rotation of the idler pinion 181 in a slight clockwise direction about a central point of the idler pinion 181. It is noted that the axis of rotation of input spur pinion 143 preferably intersects with the center point of the lower face gear 145, but, due to the offset of the idler pinion 181, the axis of rotation of the idler pinion 181 does not intersect with the center point of the lower face gear 145. The angular advance on the axis of rotation of the idler pinion 181 allows for adjusting the gears during the assembly process to equalize the backlash clearances between the idler pinion and the upper and lower face gears. Advancing the idler pinion 181 along its axis of rotation, either radially inwardly or radially outwardly, allows for further adjustment of the backlash clearances. The input spur pinions 143 achieve equal backlash clearances through minor movements of their input shafts, as forces are equalized between the two meshes with the face gears. During assembly of the idler pinions 181 in the presently preferred embodiment, to equalize tooth clearances, the teeth of the idler pinions and their respective face gears are brought into contact at the meshes between the drive sides of the teeth of driving gears and the coast sides of the teeth of driven gears. The total tooth backlash clearances remain the same as those required for proper operation of the gears in the design, as the clearances still exist on the backsides of these contacting teeth. The teeth are purposefully brought into contact for all gears at once during assembly so as to establish equal tooth index positioning. During operation, clearances will increase and decrease on both sides of all teeth as they rotate into and out of mesh, but this total clearance (i.e. backlash) on either side of a tooth between it and its adjacent teeth will remain constant. During operation, deflection of the gear teeth, gear webs, and the cantilevered pinion shafts will help facilitate the maintenance of equal load sharing and appropriate tooth clearances.

Figure 11:
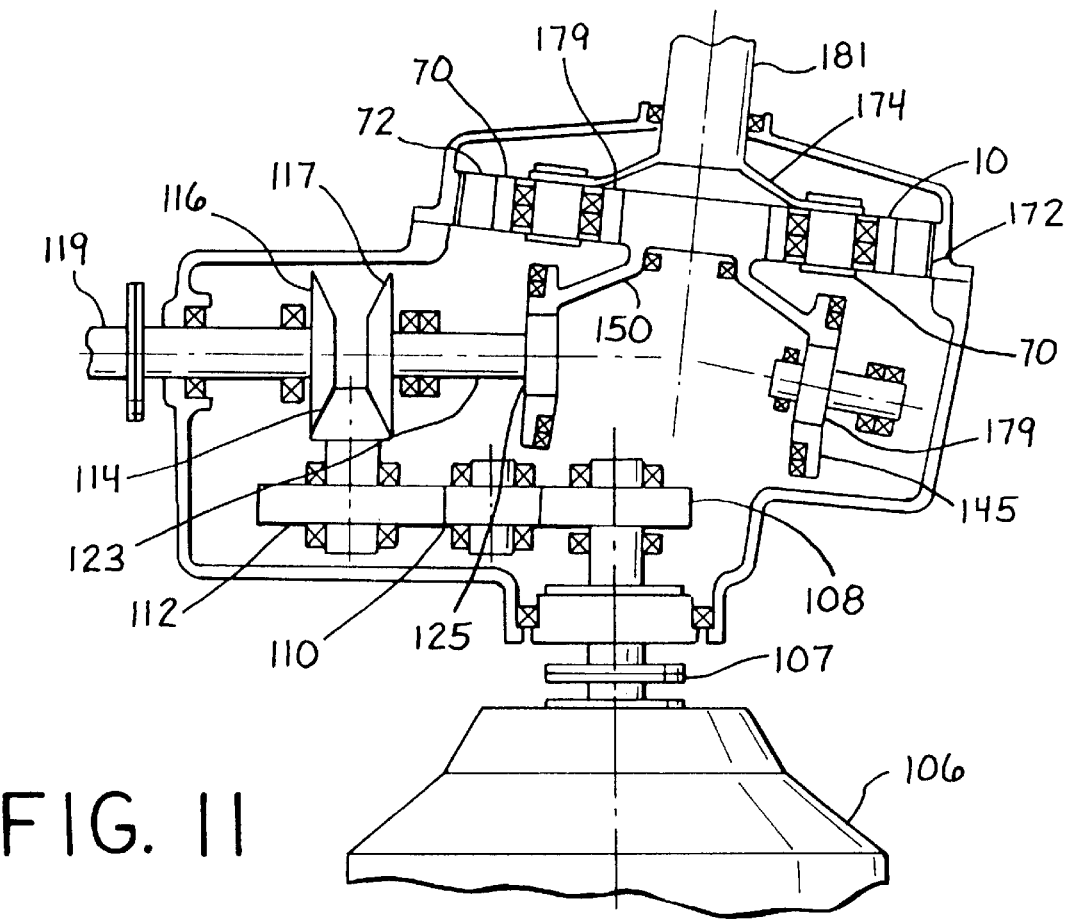
FIG. 11 illustrates a split-torque concentric face gear tilt rotor nacelle transmission, according to a preferred embodiment of the present invention.

One specific implementation of the concentric face gear transmission assembly of the presently preferred embodiment is illustrated in FIG. 11. The face gear transmission assembly is used for routing power from either a turbine engine 106 or a wing cross shaft 119 to a rotor output 181. The transmission assembly shown in FIG. 11 is located in a nacelle of a tiltrotor aircraft to thereby drive the proprotor at the end of each wing of the aircraft. Power from the turbine engine 106 is supplied to the input pinion 108 via an input clutch 107, and the torque from the input pinion 108 is transferred to a helical gear 112 via an idler gear 110.

The helical gear 112 has a bevel pinion 114 attached thereto, which is meshed with a first bevel gear 116 and a second bevel gear 117. The wing cross shaft 119 is attached to the first bevel gear 116, and a main transmission input shaft 123 is connected to the second bevel gear 117. In the event of a power failure of the turbine engine 106, power is supplied to the main transmission input shaft 123 via the wing cross shaft 119, which is connected to another power source. In the event of failure of the other power source, power from the turbine engine 106 is supplied through the bevel pinion 114 to the wing cross shaft 119. In this preferred embodiment, the other power source, which is connected to the wing cross shaft 119, comprises a second assembly similar to the assembly shown in FIG. 11, located in the other nacelle of the tilt rotor aircraft.

The main transmission input pinion 125, which is connected to the main transmission input shaft 123, drives the lower face gear 145 and the upper face gear 150. An idler pinion 179 transmits power placed on the lower face gear 145 by the main transmission input pinion 125, onto the upper face gear 150. The upper face gear 150 drives a sun gear 179, a planet gear 70, and a ring gear 172 to thereby generate the rotor output 181, which is used to drive the proprotor. In the embodiment shown in FIG. 11, only one input pinion 125 and one idler pinion 179 are used. Alternatively, additional idler pinions 179 may be used as well.

The concentric face gear transmission assembly of the present invention may be used in a wide variety of other applications. The configuration may be implemented wherever counter rotating propellers, rotors, or anti-torque fans are required. Counter rotating operation of the face gear transmission assembly can be achieved by utilizing both the upper and lower face gears as output shaft drives. Input power during counter rotating operation is provided through one or more of the input pinions or, alternatively, through one of the two face gears.

Figure 12:
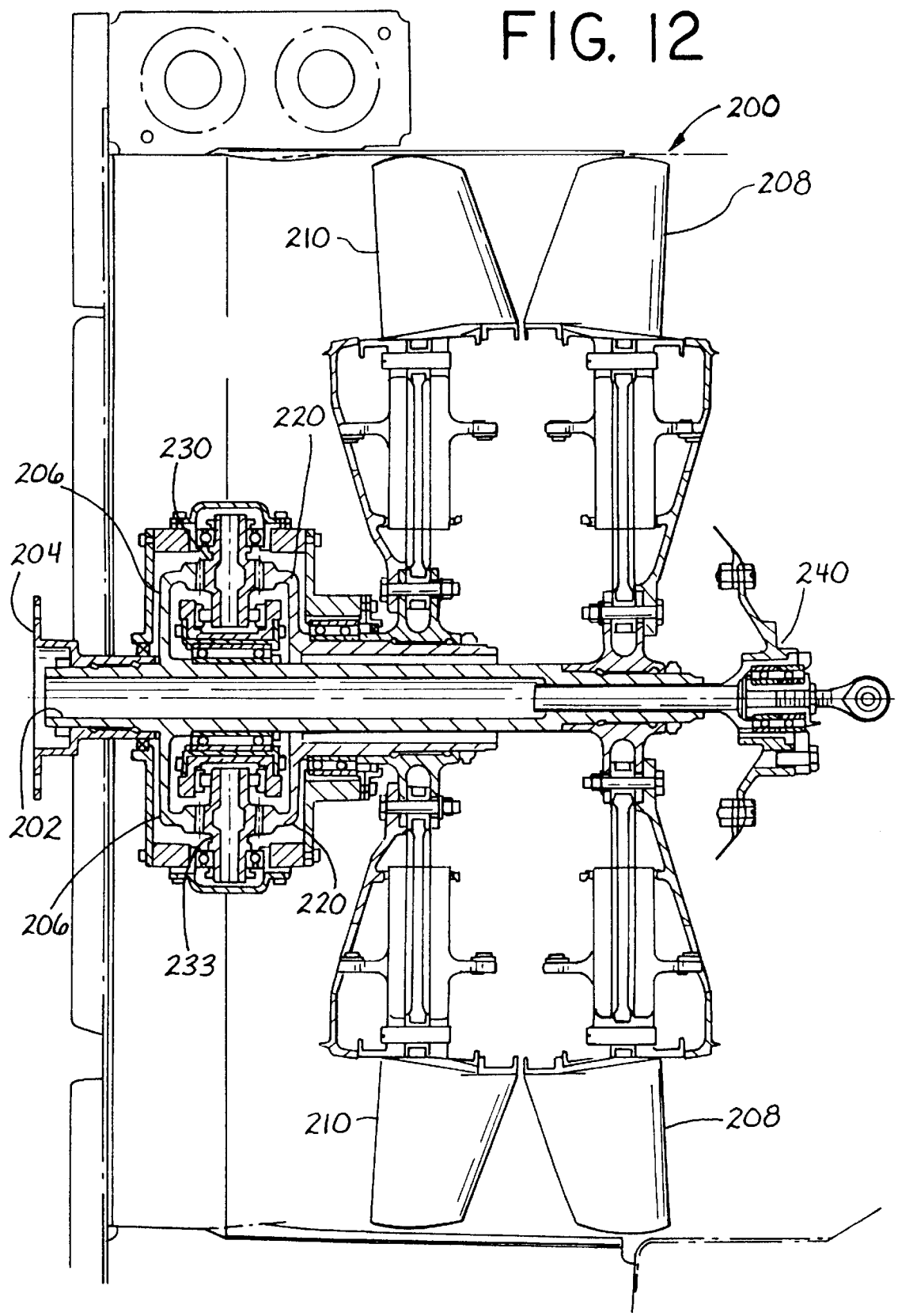
FIG. 12 illustrates a cross-sectional view of a counter-rotating fan gear box according to an alternative embodiment of the present invention.

FIG. 12 illustrates a cross-sectional view of a counter rotating fan gear box 200 according to one alternative embodiment of the present invention. An input shaft 202, which is surrounded by a coupling 204, delivers input power to the counter rotating fan gear box 200. The input shaft 202 is connected to a first face gear 206, and is also mechanically connected to a first fan 208. As presently preferred, both the first fan 208 and the second fan 210 comprise Notar fans, which can be used in combination with helicopters for supplying pressurized air into a tailboom of the helicopter, for example. A second face gear 220 is connected to the second fan 210, and is driven by the first face gear 206 via a first idler pinion 230 and a second idler pinion 233. As presently preferred, the first face gear 206 and the first fan 208 rotate in a first direction, and the second face gear 220 and the second fan 210 rotate in a second direction. The fan positioning structure 240, shown in part, preferably comprises linkage to the first fan 208 and the second fan 210 for positioning and orientating the first and second fans, 208, 210. Also, as presently preferred, both the first fan 208 and the second fan 210 pull approximately the same amount of power from the input shaft 202 via the first face gear 206 and the second face gear 220, respectively.

One variation of the counter-rotating application of the present invention allows for use of one face gear as the input driving member of the torque-split transmission, as in the previous example above. The concentric face gear transmission assembly of the present invention can be adapted to existing rotorcraft wherever increased power transmitting capability is desired. The present invention is especially applicable to rotorcraft having one or more input drive shafts. The present invention can accommodate a range of input drive shaft angles and speeds. Weight and performance benefits may be maximized when more than one input shaft is involved, for example, or when high power capacity and large speed reduction is desired.

Although exemplary embodiments of the invention have been shown and described, many other changes, modifications and substitutions, in addition to those set forth in the above paragraphs, may be made by one having ordinary skill in the art without necessarily departing from the spirit and scope of this invention.

We claim:

1. A split-torque transmission, comprising:
   a first face gear having a plurality of first face gear teeth;
   a second face gear having a plurality of second face gear teeth;
   at least one input pinion contacting both the first face gear teeth and the second face gear teeth; and
   at least one idler pinion contacting both the first face gear teeth and the second face gear teeth, the first face gear being adapted for directly driving a proprotor and the second face gear not being adapted for directly driving a proprotor, wherein the second face gear comprises an annular member without a web.

2. The split-torque transmission according to claim 1, the first face gear comprising a first thrust bearing disposed radially outwardly of the plurality of first face gear teeth, and
   the second face gear comprising a second thrust bearing disposed radially inwardly of the plurality of second face gear teeth.

3. The split-torque transmission according to claim 2, a web of the first face gear being relatively thin, compared to a thickness of a web of a face gear having a thrust bearing disposed radially inwardly of the plurality of first face gear teeth.

4. A split-torque transmission, comprising:
   a first face gear having a plurality of first face gear teeth;
   a second face gear having a plurality of second face gear teeth;
   at least one input pinion contacting both the first face gear teeth and the second face gear teeth;
   at least one idler pinion contacting both the first face gear teeth and the second face gear teeth, the first face gear being adapted for directly driving a proprotor and the second face gear not being adapted for directly driving a proprotor; and
   a second input pinion contacting both the first face gear teeth and the second face gear teeth, and a second idler pinion contacting both the first face gear teeth and the second face gear teeth.

5. The split-torque transmission according to claim 4, the first face gear teeth facing the second face gear teeth,
   the first input pinion being located opposite the second input pinion between the first face gear teeth and the second face gear teeth, and
   the first idler pinion being located opposite the second idler pinion between the first face gear teeth and the second face gear teeth.

6. The split-torque transmission according to claim 5, the at least one idler pinion being adapted for recombining torque from the second face gear to the first face gear.

7. A split-torque transmission, comprising:
   first and second concentric face gears; and
   an input pinion contacting and driving the first and second concentric face gears, the first face gear comprising a first thrust bearing disposed radially outwardly of a plurality of first face gear teeth and the second face gear comprising a second thrust bearing disposed radially inwardly of a plurality of second face gear teeth.

8. The split-torque transmission according to claim 7, wherein a net thrust component on the input pinion from the two concentric face gears is substantially zero.

9. The split-torque transmission according to claim 7, the input pinion delivering to the two concentric face gears an input torque, which is split substantially evenly between the two concentric face gears.

10. The split-torque transmission according to claim 7, further comprising at least one idler gear contacting both the first face gear and the second face gear.

11. The split-torque transmission according to claim 10, a first one of the two concentric face gears driving a proprotor and a second one of the two concentric face gears not driving a proprotor.

12. The split-torque transmission according to claim 11, wherein the at least one idler gear is adapted for recombining torque from the second one of the two concentric face gears to the first one of the two concentric face gears.

13. The split-torque transmission according to claim 11, wherein a load carried by the first one of the two face gears comprises a rotor blade.

14. The split-torque transmission according to claim 7, further comprising a planetary stage of gears.

15. The split-torque transmission according to claim 14, further comprising a second input pinion, the two input pinions being adapted for transferring power from two corresponding turbine engines to at least one rotor.

16. The split-torque transmission according to claim 15 further comprising two idler gears, and
    wherein backlash clearances of the two idler gears are equalized to ensure that a substantially equal amount of torque is carried by the two idler gears.

17. The split-torque transmission according to claim 16, wherein each of the two idler gears comprises an axis of rotation, and
    wherein the axis of rotation of each of the two idler gears does not intersect an axis of rotation of either of the two face gears.

18. The split-torque transmission according to claim 17, wherein backlash clearances of the two input pinions are equalized to ensure that substantially equal amounts of torque are delivered to each of the first and second face gears.

19. The split-torque transmission according to claim 17, wherein each of the two idler gears comprises crowned teeth.

20. A method of balancing a clearance between at least one idler pinion and two face gears, the at least one idler pinion being sandwiched between the two face gears, the method comprising the following steps:
    placing the at least one idler pinion between the two face gears, a rotational axis of the at least one idler pinion not intersecting an axis of rotation of either of the two face gears, the at least one idler pinion comprising a plurality of crowned teeth and each of the two face gears comprising a plurality of teeth; and
    moving the at least one idler pinion in a direction along its rotational axis, to thereby move the crowned idler pinion teeth into contact with the plurality of teeth of the two face gears.

21. A dual fan system, comprising:
    a first face gear having a plurality of first face gear teeth and having a first gear axis of rotation;
    a first fan connected to the first face gear, the first fan having a first fan axis of rotation;
    a second face gear having a plurality of second face gear teeth and having a second gear axis of rotation;
    a second fan connected to the second face gear, the second fan having a second fan axis of rotation, wherein the first gear axis of rotation, the first fan axis of rotation, the second gear axis of rotation, and the second fan axis of rotation are all substantially parallel; and
    at least one idler pinion contacting both the first face gear teeth and the second face gear teeth.

22. The dual fan system as recited in claim 21, the at least one pinion comprising two idler pinions.

23. The dual fan system as recited in claim 21, the first fan and the second fan being adapted for rotating in opposite directions.

24. A split-torque transmission, comprising:
    a first face gear having a plurality of face gear teeth and a first axis of rotation;
    a second face gear having a plurality of face gear teeth and a second axis of rotation;
    at least one input pinion contacting both the first face gear and the second face gear; and
    at least one idler pinion sandwiched between the first face gear and the second face gear, the at least one idler pinion comprising a plurality of crowned teeth, wherein the at least one idler pinion has an axis of rotation which does not intersect the first axis of rotation and which does not intersect the second axis of rotation.

25. The split-torque transmission as recited in claim 24, wherein the plurality of crowned teeth of the at least one idler pinion contact the face gear teeth of the first face gear and the second face gear.

* * * * *